(12) United States Patent
Hall et al.

(10) Patent No.: US 10,929,997 B1
(45) Date of Patent: Feb. 23, 2021

(54) SELECTIVE PROPAGATION OF DEPTH MEASUREMENTS USING STEREOIMAGING

(71) Applicant: Facebook Technologies, LLC, Menlo Park, CA (US)

(72) Inventors: Michael Hall, Bellevue, WA (US); Xinqiao Liu, Medina, WA (US); Zhaoming Zhu, Redmond, WA (US); Rajesh Lachhmandas Chhabria, San Jose, CA (US); Huixuan Tang, Redmond, WA (US); Shuochen Su, Seattle, WA (US); Zihe Gao, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 26 days.

(21) Appl. No.: 16/418,812

(22) Filed: May 21, 2019

Related U.S. Application Data

(60) Provisional application No. 62/674,430, filed on May 21, 2018.

(51) Int. Cl.
*G06T 7/55* (2017.01)
*G06T 7/90* (2017.01)
(Continued)

(52) U.S. Cl.
CPC ............ *G06T 7/55* (2017.01); *G02B 27/0172* (2013.01); *G06T 7/90* (2017.01); *G06T 7/97* (2017.01);
(Continued)

(58) Field of Classification Search
CPC .... G06T 7/55; G06T 7/97; G06T 7/90; G06T 7/593; G06T 7/74; G06T 7/11; G06T 7/13; G06T 7/85; G06T 7/33; G06T 7/136; G06T 2207/10028; G06T 2207/10012; G06T 2207/30261; G06T 2207/10021; H04N 13/106; H04N 13/204; H04N 13/239; H04N 13/128; H04N 13/246; H04N 13/271;
(Continued)

(56) References Cited

U.S. PATENT DOCUMENTS 9,165,211 B2 * 10/2015 Rhee .................... G06K 9/4671
10,250,871 B2 4/2019 Ciurea et al.
(Continued)

OTHER PUBLICATIONS

United States Office Action, U.S. Appl. No. 16/418,510, dated Aug. 31, 2020, 13 pages.

*Primary Examiner* — Michael S Osinski
(74) *Attorney, Agent, or Firm* — Fenwick & West LLP

(57) ABSTRACT

A depth camera assembly (DCA) determines depth information within a local area by capturing images of the local area including a local region using a plurality of imaging sensors. The local region is represented by a first set of pixels in each captured image. For each image, the DCA identifies the first set of pixels corresponding to the surface in the local region and determines a depth measurement from the DCA to the local region by comparing the first set of pixels from images captured by different imaging sensors. To determine depth measurements for second sets of pixels neighboring the first set of pixels, the DCA selectively propagates depth information from the first set of pixels to second sets of pixels satisfying one or more criteria (e.g., satisfying a threshold saturation measurement or a threshold contrast measurement).

20 Claims, 5 Drawing Sheets

(51) Int. Cl.
  *G06T 7/00* (2017.01)
  *H04N 13/106* (2018.01)
  *G02B 27/01* (2006.01)
  *H04N 13/204* (2018.01)
  *H04N 13/00* (2018.01)

(52) U.S. Cl.
  CPC ......... *H04N 13/106* (2018.05); *H04N 13/204* (2018.05); *G02B 2027/0138* (2013.01); *G02B 2027/0178* (2013.01); *G06T 2207/10028* (2013.01); *H04N 2013/0081* (2013.01)

(58) Field of Classification Search
  CPC .. H04N 13/122; H04N 13/243; H04N 13/111; H04N 13/133; H04N 13/25; H04N 2013/0081; G02B 27/0172; G06K 9/00805; G06K 9/00201; G06K 9/00798; G06K 9/00825; G06K 9/4671; G06K 9/00791; G06K 9/00818; G06K 9/3233; G06K 9/3241
  See application file for complete search history.

(56) References Cited

U.S. PATENT DOCUMENTS

| | | | | |
|---|---|---|---|---|
| 10,360,462 B2* | 7/2019 | Koishi | ................ | H04N 13/204 |
| 10,362,296 B2 | 7/2019 | Price et al. | | |
| 10,424,073 B2* | 9/2019 | Karino | ................ | G06K 9/6218 |
| 10,708,577 B2 | 7/2020 | Trail | | |
| 2002/0080998 A1* | 6/2002 | Matsukawa | ........ | G06K 9/00818 |
| | | | | 382/103 |
| 2009/0129667 A1* | 5/2009 | Ho | ....................... | G06T 15/205 |
| | | | | 382/154 |
| 2009/0244263 A1* | 10/2009 | Saito | ................ | G06K 9/00805 |
| | | | | 348/47 |
| 2010/0142852 A1* | 6/2010 | Fujita | .................... | G06T 7/593 |
| | | | | 382/285 |
| 2010/0246896 A1* | 9/2010 | Saito | ................ | G06K 9/00798 |
| | | | | 382/106 |
| 2011/0285826 A1* | 11/2011 | Bickerstaff | .......... | H04N 13/239 |
| | | | | 348/47 |
| 2013/0141575 A1* | 6/2013 | Lee | ........................ | B60W 50/14 |
| | | | | 348/148 |
| 2013/0169800 A1* | 7/2013 | Mori | ......................... | G06T 7/32 |
| | | | | 348/135 |
| 2014/0002612 A1* | 1/2014 | Morioka | .............. | H04N 13/286 |
| | | | | 348/46 |
| 2014/0028804 A1* | 1/2014 | Usuda | .................. | H04N 13/254 |
| | | | | 348/47 |
| 2014/0286536 A1* | 9/2014 | Pettersson | ............... | E02F 9/261 |
| | | | | 382/106 |
| 2015/0062166 A1* | 3/2015 | Pan | ....................... | G06T 19/006 |
| | | | | 345/633 |
| 2015/0145963 A1* | 5/2015 | Oshima | ................ | H04N 13/243 |
| | | | | 348/47 |
| 2015/0193657 A1 | 7/2015 | Gurman | | |
| 2015/0193965 A1* | 7/2015 | Chen | .................... | H04N 13/271 |
| | | | | 345/419 |
| 2015/0206313 A1 | 7/2015 | Reif et al. | | |
| 2016/0078798 A1* | 3/2016 | Watanabe | ............ | G09G 3/3648 |
| | | | | 345/690 |
| 2016/0241774 A1* | 8/2016 | Mochizuki | ........... | H04N 5/3696 |
| 2016/0304098 A1* | 10/2016 | Ito | ...................... | G06K 9/00798 |
| 2016/0373714 A1* | 12/2016 | Lee | ........................ | H04N 13/183 |
| 2017/0127048 A1* | 5/2017 | Nobayashi | ........... | H04N 13/128 |
| 2017/0180713 A1 | 6/2017 | Trail | | |
| 2017/0214845 A1* | 7/2017 | Ohara | ................ | H04N 9/04557 |
| 2017/0244960 A1 | 8/2017 | Ciurea et al. | | |
| 2018/0061070 A1* | 3/2018 | Higuchi | ................ | G06T 15/205 |
| 2018/0165528 A1* | 6/2018 | Koishi | ................. | H04N 13/239 |
| 2018/0357775 A1* | 12/2018 | Wang | .................. | G06K 9/6215 |
| 2019/0026921 A1* | 1/2019 | Murayama | ................ | G06T 7/97 |
| 2019/0058859 A1 | 2/2019 | Price et al. | | |
| 2019/0087674 A1* | 3/2019 | Gao | .................. | G06K 9/00825 |
| 2019/0259163 A1* | 8/2019 | Mao | ........................ | G06T 7/41 |
| 2020/0193636 A1* | 6/2020 | Yang | .......................... | G06T 7/13 |

* cited by examiner

SELECTIVE PROPAGATION OF DEPTH MEASUREMENTS USING STEREOIMAGING

CROSS-REFERENCE TO RELATED APPLICATION

This application claims the benefit of U.S. Provisional Application Ser. No. 62/674,430, filed on May 21, 2018, which is hereby incorporated by reference in its entirety.

BACKGROUND

The present disclosure generally relates to depth estimation from image data, and more specifically to belief propagation of depth measurements across image data.

Headsets in an artificial reality system often include or are paired with depth estimation systems that may determine depth information of environments of the artificial reality systems. Various conventional depth estimation systems implement semi-global matching (SGM) techniques to propagate a depth measurement determined for a surface of the environment surrounding the depth estimation system to other surrounding areas in the environment surrounding the surface. Such SGM techniques may be computationally expensive, increasing power consumption by depth estimation systems.

SUMMARY

A depth camera assembly (DCA) determines depth information for a surface in local area surrounding the DCA. The DCA includes at least two imaging sensors and a controller coupled to each imaging sensor. Each imaging sensor captures images of the local area surrounding the DCA. Images captured by the imaging sensors include pixels corresponding to different portions of the local area, such as sets pixels of corresponding to different objects or different surfaces in the local area surrounding the DCA.

The controller receives the captured images from the imaging sensors and, for each image, identifies a first set of pixels corresponding to the surface of the local area. The controller implements stereoimaging processes to a pair of images received from the different imaging sensors to determine a depth measurement of the surface of the local area by comparing the first set of pixels corresponding to the surface identified from each of at least two captured images received from different imaging sensors. For example, the controller applies a semi-global matching (SGM) process to an image from an imaging sensor and to a corresponding image from another imaging sensor. In the SGM process, when determining depth information for a target pixel, depth information determined for pixels neighboring the target pixel (i.e., neighboring pixels) may be used to determine the depth information for the target pixel. For example, the SGM process uses depth information for each of eight pixels adjacent to the target pixel to determine depth information for the target pixel.

However, propagation of depth information from neighboring pixels to a target pixel may yield poor depth information for the target pixel when the target pixel has certain characteristics. This decrease in depth information quality when the target pixel has certain characteristics decreases effective usage of computing resources by the controller to leverage depth information for neighboring pixels to determine depth information for the target pixel. To more efficiently use computing resources, the controller may use various criteria applied to pixels in captured images to modify a number of neighboring pixels used to determine depth information for the target pixel. For example, the controller accounts for contrast or texture of pixels in the captured images corresponding to a region including the target pixel. In such embodiments, if the target pixel is in a set of pixels associated with a contrast measurement greater than or lower than a threshold contrast measurement, the controller attenuates or halts propagation of depth information for neighboring pixels to the target pixel; however, if the target pixel is in a set of pixels having at least the threshold contrast measurement, the controller propagates depth information for neighboring pixels to the target pixel. For example, the controller determines a contrast measurement for one or more second sets of pixels that are adjacent to the first set of pixels corresponding to the surface and compares the contrast measurements for the one or more second sets of pixels to a threshold contrast level. For second sets of pixels in an image with contrast measurements above the threshold contrast level, the controller propagates the depth measurement of the first set of pixels corresponding to the surface to the second sets of pixels having contrast measurements above the threshold contrast level. However, for a second set of pixels in an image with a contrast measurement below the threshold contrast level, the controller halts or attenuates propagation of depth measurement for the first set of pixels to the second set of pixels, preserving computing power and reducing low quality depth measurements caused by low contrast. Alternatively, the controller measures the saturation of a second set of pixels adjacent to the first set of pixels and halts or attenuates propagation of depth information from the first set of pixels to the second set of pixels in response to the second set of pixels having greater than a threshold saturation. In other embodiments, the controller halts propagation of depth information from the first set of pixels to pixels in the second set of pixels that are greater than a threshold distance between the first set of pixels. This allows the DCA to offset certain environmental conditions (e.g., low pixel contrast or low pixel saturation) that may reduce the quality of depth estimation resulting from SGM techniques to a quality that does not justify the required computing power for using the SGM techniques, while decreasing power consumption of A DCA using SGM techniques.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system.

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereoscopic, or "stereo," video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a headset, a head-mounted display (HMD) connected to a host computer system, a standalone HMD, a near-eye display (NED), a mobile device or computing system, or any other hardware platform capable of providing artificial reality content to one or more viewers.

Headset

Figure 1:
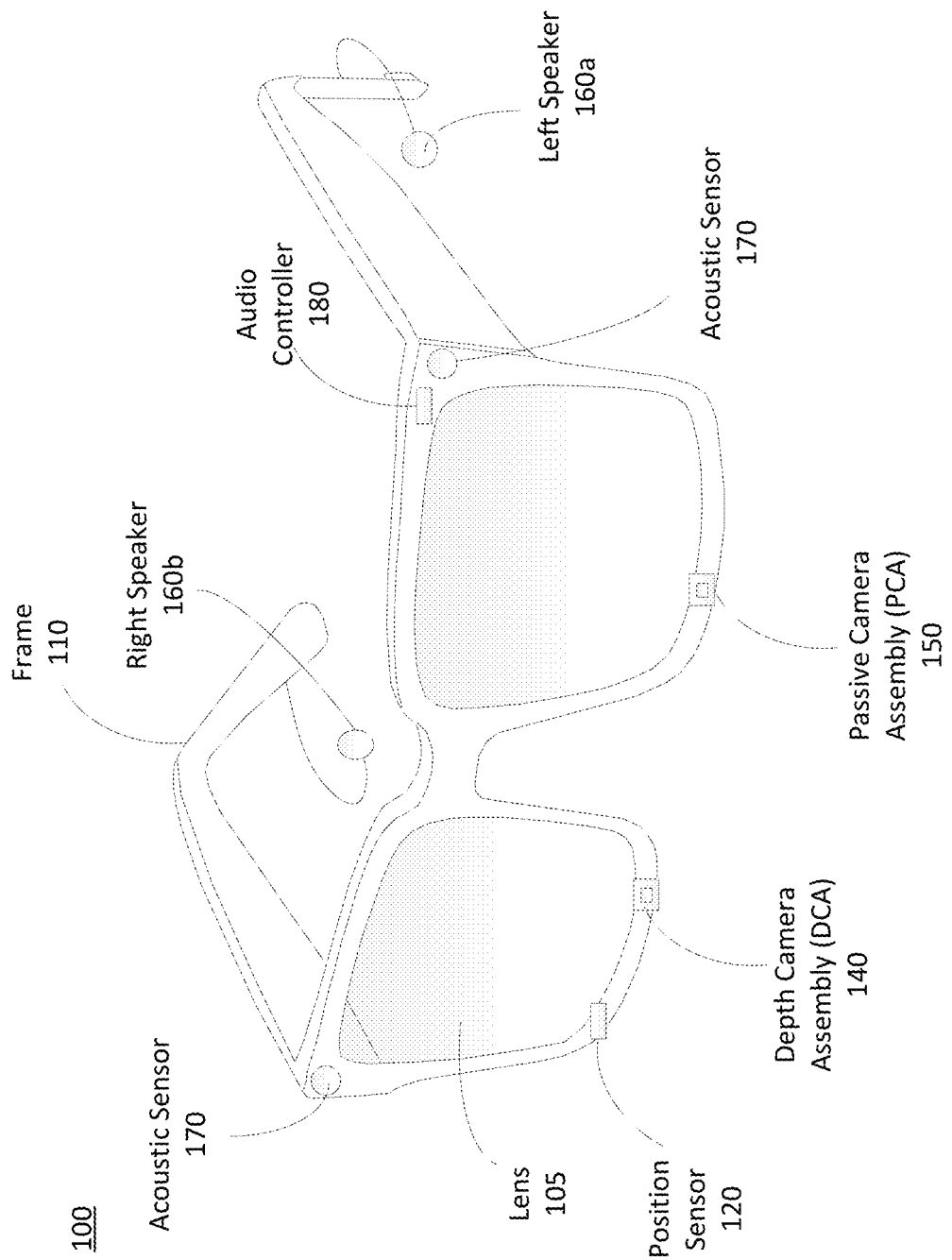
FIG. 1 is a perspective view of a headset, according to one embodiment.

FIG. 1 is a perspective view of the headset 100, in accordance with one or more embodiments. In some embodiments (as shown in FIG. 1), the headset 100 is implemented as a NED. In alternate embodiments (not shown in FIG. 1), the headset 100 is implemented as an HMD. In general, the headset 100 may be worn on the face of a user such that content (e.g., media content) is presented using one or both lenses 105 of the headset 100. However, the headset 100 may also be used such that media content is presented to a user in a different manner. Examples of media content presented by the headset 100 include one or more images, video, audio, or some combination thereof. The headset 100 may include, among other components, a frame 110, a lens 105, a depth camera assembly (DCA) 140, a passive camera assembly (PCA) 150, a position sensor 120, and an audio system. The audio system of the headset 100 shown in FIG. 1 includes a left speaker 160a, a right speaker 160b, an array of acoustic sensors 170, an audio controller 180, one or more other components, or combination thereof. The audio system of the headset 100 is an embodiment of the audio system described above in conjunction with FIG. 1. The DCA 140 and the PCA 150 may be part of simultaneous localization and mapping (SLAM) sensors mounted the headset 100 for capturing visual information of a local area surrounding some or all of the headset 100. While FIG. 1 illustrates the components of the headset 100 in example locations on the headset 100, the components may be located elsewhere on the headset 100, on a peripheral device paired with the headset 100, or some combination thereof.

The headset 100 may correct or enhance the vision of a user, protect the eye of a user, or provide images to a user. The headset 100 may be eyeglasses which correct for defects in a user's eyesight. The headset 100 may be sunglasses which protect a user's eye from the sun. The headset 100 may be safety glasses which protect a user's eye from impact. The headset 100 may be a night vision device or infrared goggles to enhance a user's vision at night. The headset 100 may be a near-eye display that produces artificial reality content for the user.

The frame 110 holds the other components of the headset 100. The frame 110 includes a front part that holds the lens 105 and end pieces to attach to a head of the user. The front part of the frame 110 bridges the top of a nose of the user. The end pieces (e.g., temples) are portions of the frame 110 to which the temples of a user are attached. The length of the end piece may be adjustable (e.g., adjustable temple length) to fit different users. The end piece may also include a portion that curls behind the ear of the user (e.g., temple tip, ear piece).

The lens 105 provides or transmits light to a user wearing the headset 100. The lens 105 may be prescription lens (e.g., single vision, bifocal and trifocal, or progressive) to help correct for defects in a user's eyesight. The lens transmits ambient light to the user wearing the headset 100. The transmitted ambient light may be altered by a prescription lens to correct for defects in the user's eyesight. The lens 105 may be a polarized lens or a tinted lens to protect the user's eyes from the sun. The lens 105 may be one or more waveguides as part of a waveguide display in which image light is coupled through an end or edge of the waveguide to the eye of the user. The lens 105 may include an electronic display for providing image light and may also include an optics block for magnifying image light from the electronic display, as further described above in conjunction with FIG. 1.

The speakers 160a and 160b produce sound for user's ears. The speakers 160a and 160b receive audio instructions from the audio controller 180 to generate sounds. The left speaker 160a may obtains a left audio channel from the audio controller 420, and the right speaker 160b obtains and a right audio channel from the audio controller 420. As illustrated in FIG. 1, each speaker 160a, 160b is coupled to an end piece of the frame 110 and is placed in front of an entrance to the corresponding ear of the user. Although the speakers 160a and 160b are shown exterior to the frame 110, the speakers 160a and 160b may be enclosed in the frame 110. In some embodiments, instead of individual speakers 160a and 160b for each ear, the headset 100 includes a speaker array (not shown in FIG. 1) integrated into, e.g., end pieces of the frame 110 to improve directionality of presented audio content.

The DCA 140, further described below in conjunction with FIG. 2, captures depth image data describing depth information for a local area surrounding the headset 100, such as a room. In some embodiments, the DCA 140 may include a light projector (e.g., structured light and/or flash illumination for time-of-flight), a plurality of imaging devices, and a controller. The captured data may be images captured by the imaging devices of light projected onto the local area by the light projector. In one embodiment, the DCA 140 includes a controller and two or more imaging devices (e.g., cameras) that are oriented to capture images of portions of the local area in stereo. The controller of the DCA 140 computes depth information of the local area using the captured images and depth determination techniques (e.g., structured light, time-of-flight, stereo imaging, etc.). Based on the depth information, the controller of the DCA 140 may determine absolute positional information of the headset 100 within the local area. The controller of the DCA 140 may also generate a model of the local area. The DCA 140 may be integrated with the headset 100 or may be positioned within the local area external to the headset 100. In some embodiments, the controller of the DCA 140 may transmit the depth image data to a processing server via a network or other communication channel.

The PCA 150 includes one or more passive cameras that generate color (e.g., RGB) image data. Unlike the DCA 140 that uses active light emission and reflection, the PCA 150 captures light from the environment of a local area to generate image data. Rather than pixel values defining depth or distance from the imaging device, the pixel values of the image data may define the visible color of objects captured in the imaging data. In some embodiments, the PCA 150 includes a controller that generates the color image data based on light captured by the passive imaging device. In some embodiments, the DCA 140 and the PCA 150 share a common controller. For example, the common controller may map each of the one or more images captured in the visible spectrum (e.g., image data) and in the infrared spectrum (e.g., depth image data) to each other. In one or more embodiments, the common controller is configured to, additionally or alternatively, provide the one or more images of the local area to the audio system, or to any other suitable components.

The array of acoustic sensors 170 monitor and record sound in a local area surrounding some or all of the headset 100. As illustrated in FIG. 1, the array of acoustic sensors 170 include multiple acoustic sensors with multiple acoustic detection locations that are positioned on the headset 100. The array of acoustic sensors 170 may provide the recorded sound as an audio stream to the audio 180.

The position sensor 120 generates one or more measurement signals in response to motion of the headset 100. The position sensor 120 may be located on a portion of the frame 110 of the headset 100. The position sensor 120 may include a position sensor, an inertial measurement unit (IMU), or both. Some embodiments of the headset 100 may or may not include the position sensor 120 or may include more than one position sensor 120. In embodiments in which the position sensor 120 includes an IMU, the IMU generates IMU data based on measurement signals from the position sensor 120. Examples of a position sensor 120 include: one or more accelerometers, one or more gyroscopes, one or more magnetometers, another suitable type of sensor that detects motion, a type of sensor used for error correction of the IMU, or some combination thereof. The position sensor 120 may be located external to the IMU, internal to the IMU, or some combination thereof.

Based on the one or more measurement signals, the position sensor 120 estimates a current position of the headset 100 relative to an initial position of the headset 100. The estimated position may include a location of the headset 100 and/or an orientation of the headset 100 or the user's head wearing the headset 100, or some combination thereof. The orientation may correspond to a position of each ear relative to a reference point. In some embodiments, the position sensor 120 uses the depth information and/or the absolute positional information from the DCA 140 to estimate the current position of the headset 100. The position sensor 120 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 100 from the sampled data. For example, the IMU integrates the measurement signals received from the accelerometers over time to estimate a velocity vector and integrates the velocity vector over time to determine an estimated position of a reference point on the headset 100. The reference point is a point that may be used to describe the position of the headset 100. While the reference point may generally be defined as a point in space, in practice the reference point is defined as a point within the headset 100.

The audio controller 180 provides audio instructions to the speakers 160a, 160b for generating sound by generating audio content using a set of acoustic parameters (e.g., a room impulse response). The audio controller 180 presents the audio content to appear originating from an object (e.g., virtual object or real object) within the local area, e.g., by transforming a source audio signal using the set of acoustic parameters for a current configuration of the local area.

The audio controller 180 may obtain visual information describing at least a portion of the local area, e.g., from the DCA 140 and/or the PCA 150. The visual information obtained at the audio controller 180 may include depth image data captured by the DCA 140. The visual information obtained at the audio controller 180 may further include color image data captured by the PCA 150. The audio controller 180 may combine the depth image data with the color image data into the visual information that is communicated (e.g., via a communication module coupled to the audio controller 180, not shown in FIG. 1) to a mapping server for determination of a set of acoustic parameters. In one embodiment, the communication module (e.g., a transceiver) may be integrated into the audio controller 180. In another embodiment, the communication module may be external to the audio controller 180 and integrated into the frame 110 as a separate module coupled to the audio controller 180. In some embodiments, the audio controller 180 generates an audio stream based on sound in the local area monitored by the array of acoustic sensors 170 or by another component. The communication module coupled to the audio controller 180 may selectively communicate the audio stream to update the visual model of physical spaces at the mapping server.

Figure 2:
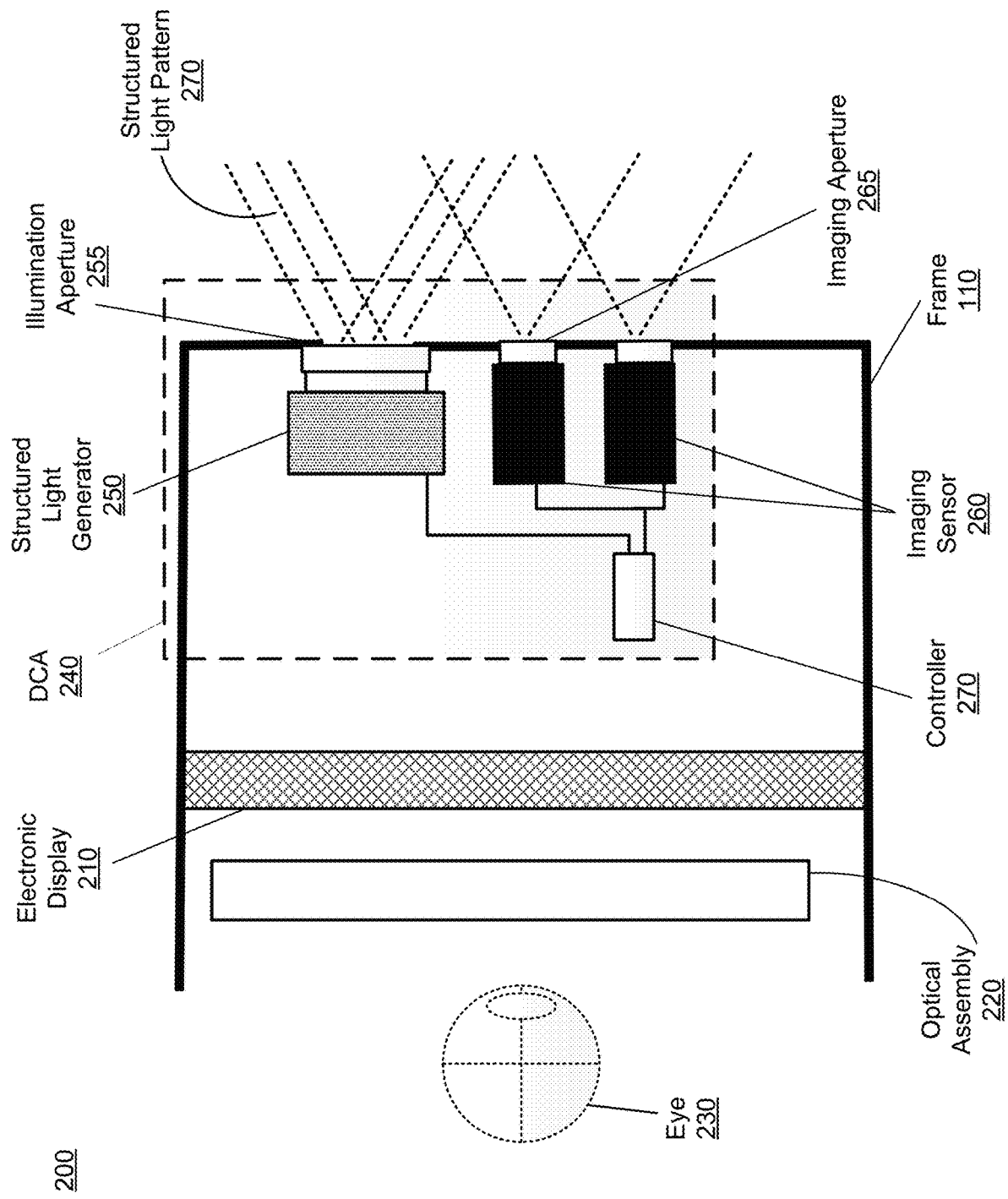
FIG. 2 is a cross-section of a depth camera assembly, according to one embodiment.

FIG. 2 is a cross-section 200 of the frame 110 of the headset 100 shown in FIG. 1. As shown in FIG. 2, enclosed in the frame 110 is an electronic display 210 and an optical assembly 220 that together provide image light to a pupil. For purposes of illustration, FIG. 2 shows a cross-section 200 associated with a single eye 230, but another optical assembly 220, separate from the optical assembly 220, provides altered image light to another eye of the user. The frame 110 also has an optical axis corresponding to a path along which image light propagates through the frame 110.

The electronic display 210 generates image light. In some embodiments, the electronic display 210 includes an optical element that adjusts the focus of the generated image light. The electronic display 210 displays image to the user in accordance with data received from a console (not shown in FIG. 2). The electronic display 210 may include a single electronic display or multiple electronic displays (e.g., a display for each eye of a user). Examples of the electronic display 210 include a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 210 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, one or more of the display block optical elements may have one or more coatings, such as anti-reflective coatings.

The optical assembly 220 magnifies received light from the electronic display 210 and corrects optical aberrations associated with the image light, with the corrected image light presented to a user of the headset 100. At least one optical element of the optical assembly 220 may be an aperture, a Fresnel lens, a refractive lens, a reflective surface, a diffractive element, a waveguide, a filter, or any other suitable optical element that affects the image light emitted from the electronic display 210. Moreover, the optical assembly 220 may include combinations of different optical elements. In some embodiments, one or more of the optical elements in the optical assembly 220 may have one or more coatings, such as anti-reflective coatings, dichroic coatings, etc. Magnification of the image light by the optical assembly 220 allows elements of the electronic display 210 to be physically smaller, weigh less, and consume less power than larger displays. Additionally, magnification may increase a field-of-view of the displayed media. For example, the field-of-view of the displayed media is such that the displayed media is presented using almost all (e.g., 110 degrees diagonal), and in some cases, all, of the user's field-of-view. In some embodiments, the optical assembly 220 is designed so its effective focal length is larger than the spacing to the electronic display 210, which magnifies the image light projected by the electronic display 210. Additionally, in some embodiments, the amount of magnification may be adjusted by adding or removing optical elements.

As shown in FIG. 2, the frame 110 further includes a DCA 240 for determining depth information of one or more objects in a local area surrounding some or all of the headset 100. The DCA 240 includes a structured light generator 250, one or more imaging sensors 260, and a controller 270 that may be coupled to both the structured light generator 250 and each of the imaging sensors 260. The structured light generator 250 emits structured light through the illumination aperture 255. In various embodiments, the structured light is a pattern of dots projected onto a surface. The structured light generator 250 may emit the structured light in accordance with emission instructions generated by the controller 270.

Each of the imaging sensors 260, for example a camera, captures one or more images of one or more objects in the local area. In some embodiments, an imaging sensor 260 captures, through the imaging aperture 265, portions of the one or more structured light patterns (e.g., polarized structured light patterns) scattered or reflected from the local area to illuminate objects in the local area. As further described below in conjunction with FIG. 3, images captured by an imaging sensor 260 comprise multiple pixels that may be analyzed using stereoimaging techniques to determine depth measurements from the DCA 140 to surfaces or objects in the local area that are captured in each image. In one embodiment, the imaging sensor 260 comprises a two-dimensional array of pixels, with each pixel including a photodetector, such as a photodiode.

The controller 270 determines depth information from the DCA 140 to one or more surfaces or objects included in the local area on captured images of the local area including the one or more surfaces or objects. As further described below, the controller 270 implements stereoimaging techniques to determine a depth measurement or depth information from the DCA 140 to different locations in the local area surrounding the DCA 140 by comparing the pixels of the local region in a first image of the local area captured by a first imaging sensor 260 to pixels of a second image of the same local region of the local area captured at a corresponding time from a second imaging sensor 260. In some embodiments, the controller 270 provides the determined depth information to a console (not shown in FIG. 2) or an appropriate module of the headset 100 (e.g., a varifocal module, not shown in FIG. 2). The console or the headset 100 may use the depth information to, generate content for presentation on the electronic display 210 or for other suitable operations.

In various embodiments, the controller 270 may identify individual pixels of an imaging sensor 260 and retrieve digital values from each pixel of an imaging sensor 260. To conserve computational resources, the controller 270 but applies one or more processes to digital values retrieved from specific subsets of pixels rather than to digital values retrieved from each pixel of the imaging sensor 260. In one embodiment, the controller 270 applies a semi-global matching (SGM) process to a subset of regions within an image rather to the image captured by the imaging sensor 260 as a whole. In such an embodiment, the controller 270 identifies several regions within the local area captured in an image by grouping pixels of the image based on a variety of measured conditions, such as the proximity of pixels to other pixels of the image, based contrast measurements for various pixels, or saturation measurements for each pixel. When determining depth measurements for pixels in a captured image, the controller 270 propagates a depth measurement determined for a set of pixels corresponding to a first region to adjacent or surrounding pixels corresponding to other regions that satisfy one or more threshold conditions. Example threshold conditions include a pixel contrast measurement, a pixel saturation measurement, or a measured distance between pixels of different regions.

Propagating Depth Measurements Across Regions of an Area

Figure 3:
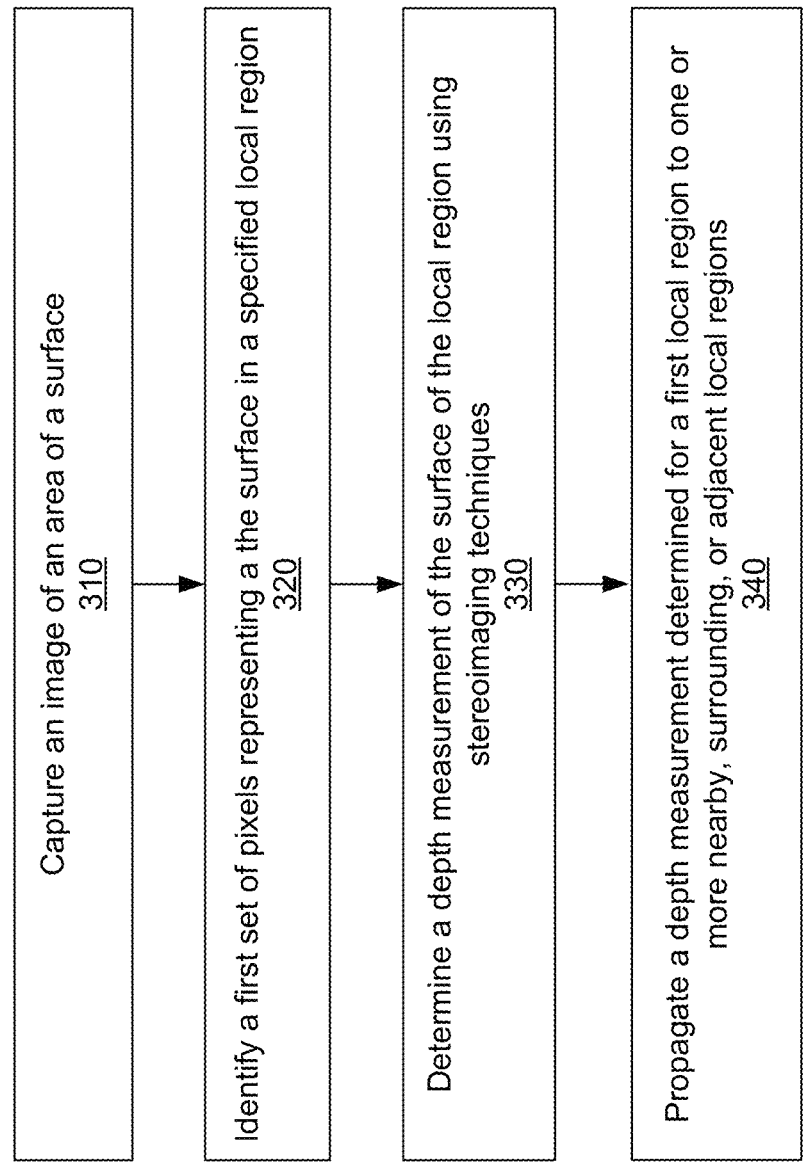
FIG. 3 is a flowchart of one embodiment of a method for propagation of depth information across pixels of images captured by imaging sensors of the depth camera assembly, according to one embodiment.

FIG. 3 is a flowchart of one embodiment of method 300 for propagation of depth information across pixels of images captured by imaging sensors 260 of a depth camera assembly (DCA) 140. In various embodiments, the method 300 includes different steps than those described in conjunction with FIG. 3. Additionally, in various embodiments, steps of the method 300 may be performed in a different order than the order described in conjunction with FIG. 3.

Each of a plurality of imaging sensors 260 of the DCA 140 captures 310 an image of a local area surrounding the DCA 140. For example, the imaging sensors 260 capture images of a surface included in the local area. In some embodiments, the image may be divided into local regions, for example tiled sections encompassing the entirety of the local area captured by the image. Each local region may be represented by a set of pixels of the image. For example, a first local region corresponds to a first set of pixels, while a second local region adjacent to the first local region corresponds to a second set of pixels adjacent to the first set of pixels. In alternate embodiments, two adjacent local regions may include one or more overlapping pixels. In some embodiments, an imaging sensor 260 may capture an image under ambient lighting conditions available in the environment. Alternatively, the structured light generator 250 emits a structured light pattern 270 to illuminate a portion of the local area, such as a surface in the local area, to improve the quality of the image captured by the imaging sensors 260. An imaging sensor 260 is positioned relative to other imaging sensors 260 so each imaging sensor captures an image of the same area from a different angle. Accordingly, each imaging sensor 260 captures a different perspective of an area on a surface in the local area. In the embodiment illustrated in FIG. 4, a local region is represented as a rectangular tile including one or more pixels, while in alternate embodiments, a local region may be represented as a tile having any suitable geometric shape.

For each image, the controller 270 identifies 320 a first set of pixels representing the local region of the local area; for example, the first set of pixels represents a surface of the local region in the local area. To identify 320 the first set of pixels, the controller 270 may overlay an image with a pattern of tiles or grid cells to outline each local region of the local area captured by the image. The controller 270 analyzes each captured image to identify sets of pixels representing different local regions in the image. For example, the controller 270 generates a mapping that, in response to selection of a local region in an image, identifies sets of pixels representing the selected local region in other images captured by an imaging sensor 260.

From the images captured by each of the plurality of imaging sensors, the controller 270 determines 330 a depth measurement of the local region. The depth measurement specifies a distance between the DCA 140 and a surface in the local region. In various embodiments, the controller 270 determines 330 the depth measurement using one or more stereoimaging processes to compare sets of pixels representing a common local region in images captured by multiple imaging sensors 260. Based on one or more differences in the sets of pixels representing the local region in images captured by different imaging sensors 260, the controller 270 determines the depth measurement for the local region.

In various embodiments, a stereoimaging process, such as semi-global matching (SGM), determining depth information for a pixel in the first set of pixels corresponding to the local region, the controller 270 propagates 340 depth information determined 330 pixels neighboring the pixel to the pixel and accounts for the depth information for the neighboring pixels when determining 330 depth information for the pixel. Hence, the controller 270 may propagate 340 a depth measurement determined for a first local region to one or more adjacent or nearby other local regions. To conserve computational resources, the controller 270 may selectively propagate 340 a depth measurement for a first set of pixels to a second set of pixels when the second set of pixels satisfy one or more criteria, but attenuate propagation of the depth measurement for the first set of pixels (or not propagate 340) the depth measurement for the first set of pixels to the second set of pixels when the second set of pixels do not satisfy the one or more criteria. Example criteria for propagating 340 the depth measurement for the first set of pixels to another set of pixels include a threshold saturation of the other set of pixels, a threshold contrast of the other set of pixels, and a threshold distance between the first set of pixels and the other set of pixels. Propagation of depth measurements across an area of a captured image is further described with reference to FIG. 4.

In some embodiments, the controller 270 determines a contrast measurement for each set of pixels of an image representing a local region (hereafter referred to as a "second set of pixels") neighboring the set of pixels representing the first region. A contrast is the difference in luminance, color, distance, or other measurable quantity that makes an object (or its representation in an image or display) distinguishable. The contrast in the images correlates to local depth performance within a local region. For example, a contrast measurement refers to a difference in measurement of the intensity of two groups of pixels, one of which includes a target pixel. In one such embodiment, the controller 270 measures the contrast of a set of pixels by determining a ratio of a difference in luminance for the set of pixels to an overall luminance for all pixels across the captured image. The controller 270 may use a variety of contrast algorithms, such as Weber contrast, Michelson contrast, Root mean square (RMS) contrast, etc. to determine contrast measurements for different pixels or for different sets of pixels.

In some embodiments, the controller 270 defines a contrast at each pixel (i,j). In some embodiments, the controller 270 calculates a pixel-wise contrast for an image using the formula:

$$RawContrast_{i,j} = \sqrt{\left[\frac{(I_{i,j+1} - I_{i,j})^2}{2(I_{i,j+1} + I_{i,j})}\right]^2 + \left[\frac{(I_{i+1,j} - I_{i,j})^2}{2(I_{i+1,j} + I_{i,j})}\right]^2} \quad (1)$$

where $I_{i,j}$ is the Digital numbers of sensor pixel (i,j), and where i and j are integer values representing the i-th column and j-th row of a pixel in an image sensor.

The controller 270 may subsequently calculate a sliding-window maximum of the pixel-wise contrast using:

$$Contrast_{i,j} = \max[RawContrast_{k,l}] \quad (2)$$

$$k \in [i-w, i+w], l \in [j-w, j+w]$$

where the window size is 2w+1, and (k,l) are integer values representing the pixels within the sliding window centered at (i,j).

The controller 270 may process each pixel of a captured image to determine a contrast measurement for each pixel of the image. This per-pixel contrast measurement allows the controller 270 to compare contrast measurements for individual pixels to a threshold value, so the controller 270 determines on an individual pixel basis whether depth measurements for neighboring pixels are propagated 340 to a target pixel or group of pixels including a target pixel. Alternatively, the controller 270 determines a contrast measurement for a set of pixels in a local region, for example as an aggregate contrast measurement based on individual contrast measurements for pixels of a set of pixels. The controller 270 may determine average contrast values for all pixels in the set of pixels and compare the average contrast measurement to the threshold value. The controller 270 may also determine a count of pixels in the set with contrast measurements equaling or exceeding the threshold value and compare the count of pixels in the set having contrast measurements equaling or exceeding the threshold value to a threshold count or compare a percentage of pixels in the set having contrast measurements equaling or exceeding the threshold value to a threshold percentage. In the preceding example, depth information from a neighboring set of pixels is propagated 340 to a set of pixels where the count of pixels in the set having contrast measurements equaling or exceeding the threshold value is at least the threshold count or where the percentage of pixels in the set having contrast measurements equaling or exceeding the threshold value is at least the threshold percentage.

In different embodiments, the controller 270 may compare the contrast measurement for a set of pixels to a threshold value specifying an upper limit or a lower limit. When the threshold value is a maximum contrast threshold, a depth measurement for a first set of pixels are propagated to second sets of pixels with contrast measurements below the maximum contrast threshold, but are not propagated to second sets of pixels with contrast measurements above the maximum contrast threshold. In embodiments in which the threshold value is a minimum contrast threshold, a depth measurement of a first set of pixels is propagated to second sets of pixels with contrast measurements above the minimum contrast threshold, while the depth measurement is not be propagated second sets of pixels with contrast measurements below the minimum contrast threshold. In other embodiments, the controller 270 may use both an upper limit and a lower limit to define a range of a contrast measurements for which depth measurements are propagated, so a depth measurement for a first set of pixels is propagated to adjacent or neighboring second sets of pixels with contrast measurements within the range of contrast measurements.

When the controller 270 compares a contrast measurement for a set of pixels to a threshold value, the controller 270 may assign a first weight to contrast measurements above the threshold value and a second weight, which is less than the first weight, to contrast measurements below the threshold value. When determining a depth measurement for second set of pixels, the controller 270 applies the weight assigned to the contrast measurement of the second set of pixels to the depth measurement for the first set of pixels. For example, the controller 270 multiplies the depth measurement for the first set of pixels by the weight assigned to the contrast measurement of the second set of pixels. In other embodiments, the controller 270 may categorize contrast measurements using more than two weights that correspond to different values for contrast measurements to more particularly refine application of the depth measurement for the first set of pixels when determining a depth measurement for a second set of pixels. In the embodiments described above in which the controller 270 determines a contrast measurement for each pixel, the controller 270 may determine a depth measurement for each pixel by assigning a weight to each pixel based on a comparison of the pixel's contrast measurement to a threshold value. The controller 270 applies the weight assigned to a pixel to depth measurements from adjacent pixels to determine the depth measurement for the pixel.

In another embodiment, the controller 270 determines a distance in the image between a second set of pixels and a first set of pixels. In some embodiments, the controller 270 identifies a boundary enclosing each pixel of a set and determines a distance, for example a perpendicular distance, between the boundaries of different sets of pixels. The controller 270 propagates a depth measurement for the first set of pixels to second sets of pixels that are within a threshold distance of the first set of pixels. In alternate embodiments, the controller 270 may identify a distance, for example a perpendicular distance, between each pixel of the first set of pixels and each pixel of a second set of pixels. The controller 270 may identify particular pixels of the second set of pixels within the threshold distance of at least one pixel of the first set or within the threshold distance of a threshold number of pixels of the first set and propagate the depth measurement of the first set of pixels to the identified particular pixels of the second set of pixels. Alternatively, the controller 270 propagates the depth measurement for the first set of pixels to an second set of pixels in response to at least a threshold amount (e.g., number, percentage) or pixels of the second set of pixels being within the threshold distance of at least a threshold amount (e.g., number, percentage) of pixels of the first set In some embodiments, the controller 270 determines a saturation measurement for each pixel of the image. As described herein, a saturation measurement characterizes intensity of one or more colors in pixels of the imaging sensors 260. For example, a pixel having an intensity of one or more colors above a threshold value specified during configuration of the DCA 140 is characterized as saturated. For example, if an imaging sensor includes ret-blue-green (RGB) pixels, a pixel having above a threshold color value is identified as a saturated pixel. The controller 270 may compare a saturation measurement for a pixel or a saturation measurement determined for a set of pixels to a threshold saturation value and propagate 340 a depth measurement determined for an adjacent pixel or for an adjacent set of pixels to the pixel or to the set of pixels in response to the saturation measurement for a pixel or a saturation measurement determined for a set of pixels being less than or equal to the threshold saturation measurement. As further described above regarding contrast measurements, the controller 270 may determine a saturation measurement for individual pixels or for sets of pixels. The methods described above for determining an aggregate contrast measurement may also be used to determine an aggregate saturation measurement for a set of pixels.

As described above regarding propagation of depth measurements based on contrast measurements, the controller 270 may compare a saturation measurement for an individual pixel or for a set of pixels to a threshold maximum value, to a threshold minimum value, or to a threshold range of values. Hence, depth measurements for a pixel are propagated to a pixel or to multiple pixels adjacent to the pixel satisfying those conditions. As further described above, the controller 270 may assign a weight to a pixel or to a set including multiple pixels based on the saturation measurement for the pixel or the set of pixels. For example, a first weight is assigned to a set of pixels if the saturation measurement for the set of pixels is greater than a threshold, while a different second weight is assigned to the set of pixels if the saturation measurement for the set of pixels is less than the threshold. The weight assigned to the pixel is applied to depth measurements for pixels, or for additional sets of pixels, adjacent to the set of pixels that are propagated to the set of pixels to determine a depth measurement for the set of pixels.

Figure 4:
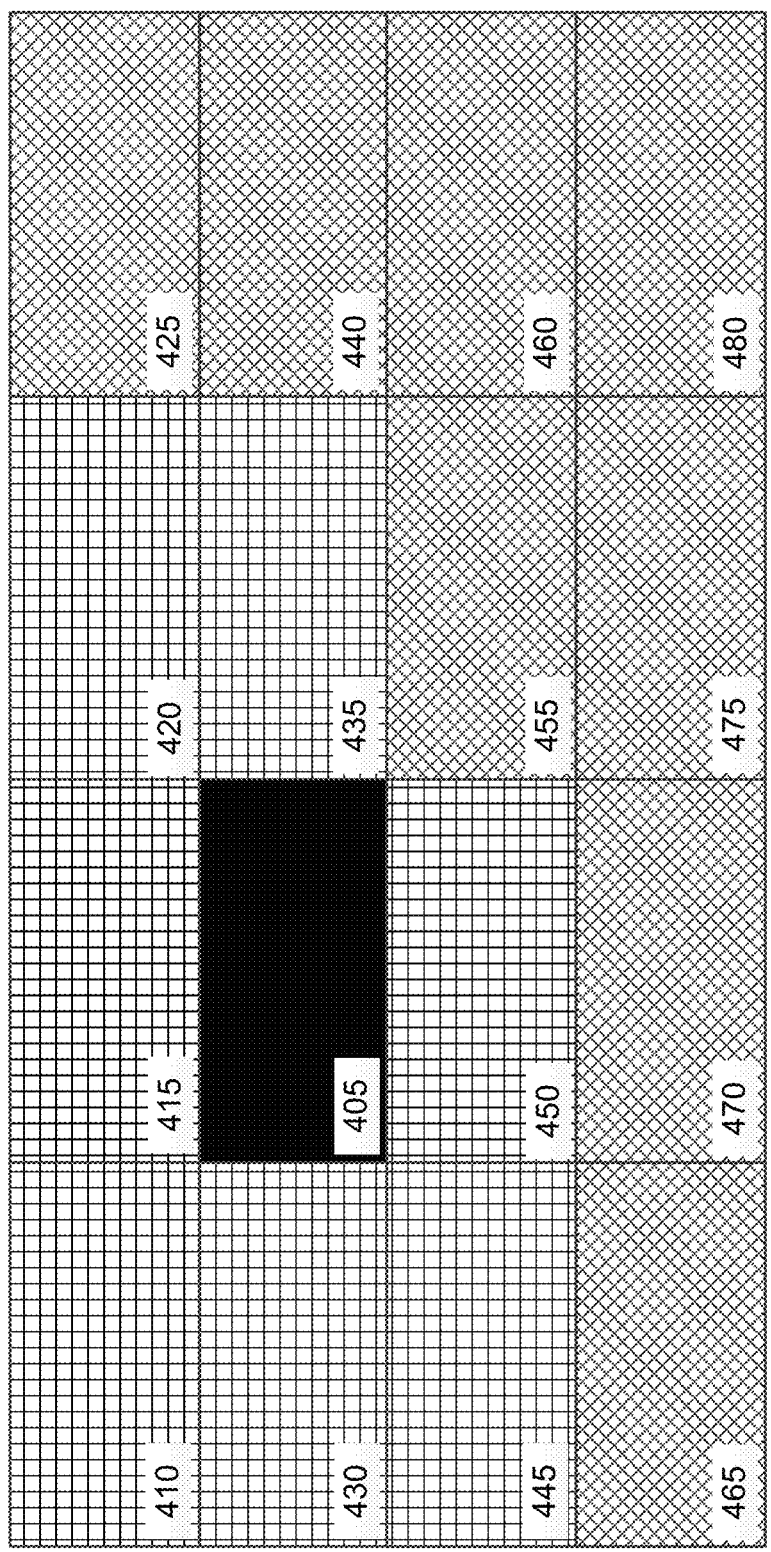
FIG. 4 is an example illustration identifying neighboring sets of pixels in an image, according to one embodiment.

FIG. 4 is an example illustration of local regions of an image including pixels neighboring a first set of pixels, according to one embodiment. In the illustrated embodiment of FIG. 4, an image captured by an image sensor, for example imaging sensor 260, is divided by a controller, for example controller 270, into several sets of pixels—sets 405, 410, 415, 420, 425, 430, 435, 440, 445, 450, 455, 460, 465, 470, 475, and 480 in FIG. 4. In the example shown by FIG. 4, sets of pixels comprise rectangular regions of the captured area including multiple pixels. However, in other embodiments, the sets of pixels may have any suitable shape or size. In FIG. 4, a set 405 of pixels represents a first set of pixels for which a depth measurement has been determined through one or more stereoimaging processes. Also in FIG. 4, sets 410-480 of pixels represent second sets of pixels neighboring the first set 405. In the example of FIG. 4, sets 410, 415, 420, 430, 435, 445, and 450 of pixels are each associated with a contrast measurement within a first range of contrast measurements and sets 425, 440, 455, 460, 465, 470, 475, and 480 are each associated with a contrast measurement within a different second range of contrast measurements. For illustrative purposes, sets of pixels associated with contrast measurements within the first range are represented with a perpendicular line cross-hatchings and sets associated with contrast measurements within the second range are represented with diagonal line cross-hatchings. In other embodiments, sets 410-480 of pixels may be categorized based on threshold distance measurements, based on threshold saturation measurements, or any other suitable information (which may be instead of or in combination with the contrast measurements described above).

In one embodiment, a controller, for example the controller 270, executes instructions to propagate the depth measurement determined for set 405 of pixels to neighboring sets of pixels having contrast measurements within the first threshold range. In such an embodiment, the depth measurement for set 405 of pixels is propagated to sets 410, 415, 420, 430, 435, 445, and 450, but is not propagated to sets 425, 440, 455, 460, 465, 470, 475, and 480 of pixels. In one or more alternative embodiments, the controller propagates the depth measurement determined for set 405 of pixels to neighboring sets of pixels having contrast measurements satisfying the second threshold range, so the controller propagates the depth measurement for set 405 of pixels to sets 425, 440, 455, 460, 465, 470, 475, and 480. In the preceding example, the controller does not propagate the depth measurement for set 405 of pixels to sets 410, 415, 420, 430, 435, 445, and 450 of pixels. In some embodiments, when propagating the depth measurement for set 405 of pixels to sets 410-480 of pixels, the controller applies a first weight to the depth measurement for set 405 of pixels when propagating the depth measurement to sets 410, 415, 420, 430, 435, 445, and 450 of pixels and applies a different second weight to the depth measurement for set 405 of pixels 405 when propagating the depth measurement to sets 425, 440, 455, 460, 465, 470, 475, and 480.

In other embodiments, sets of pixels may be categorized based on threshold distance measurements or based on threshold saturation measurements instead of or in combination with the contrast measurements described above. Implementations involving saturation measurements may be consistent with the description above. In implementations involving the distance measurements between sets of pixels, the sets 410, 415, 420, 430, 435, 445, 450, and 455 of pixels may be associated with distances relative to set 405 of pixels satisfying a threshold distance measurement, while distances of sets 425, 440, 460, 465, 470, 475, and 480 of pixels relative to set 405 of pixels do not satisfy the threshold distance measurement. Thus, the depth measurement determined for set 405 would be propagated to sets 410, 415, 420, 430, 435, 445, 450, and 455 of pixels, but not propagated to sets 425, 440, 460, 465, 470, 475, and 480 of pixels.

System Environment

Figure 5:
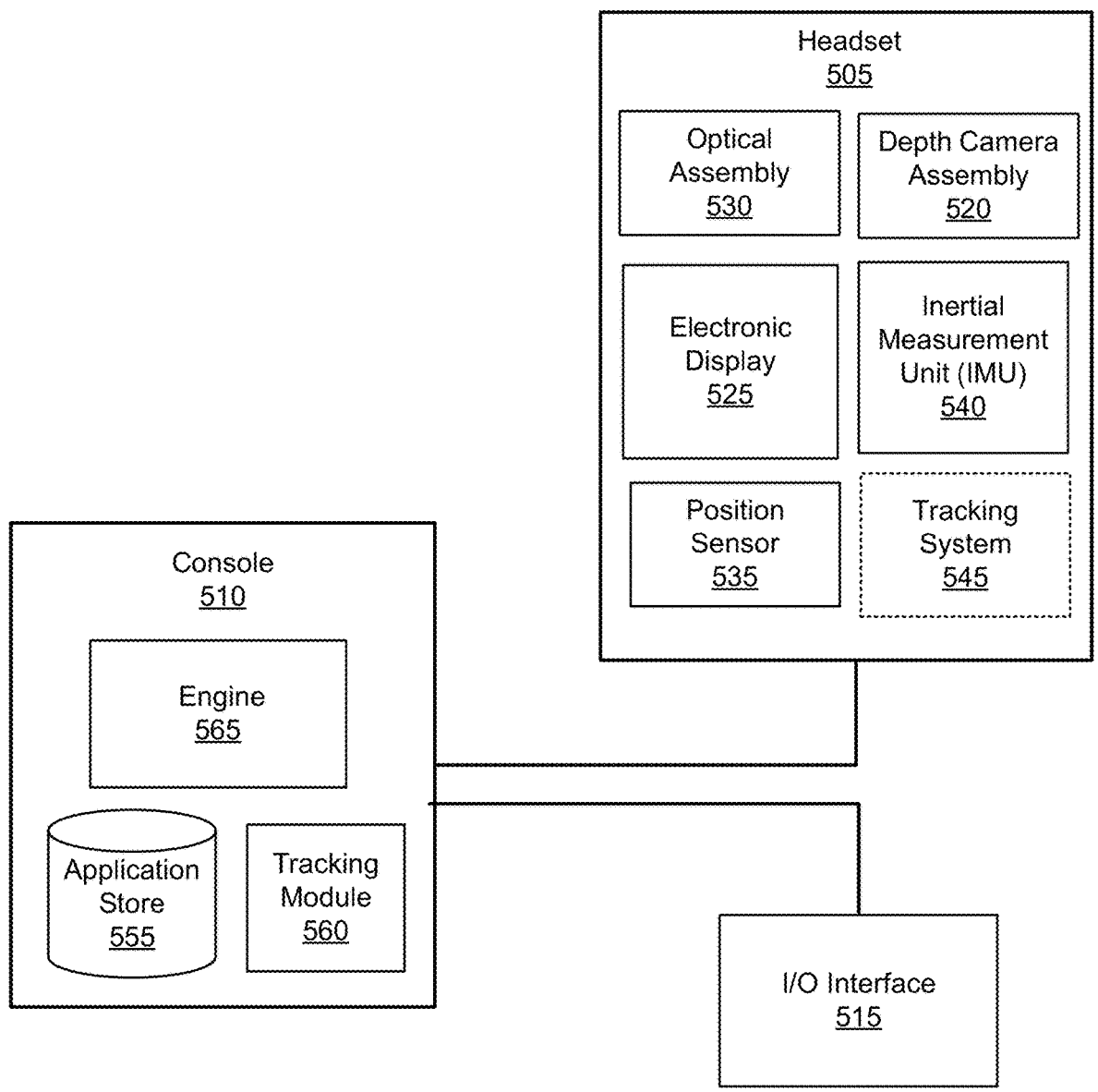
FIG. 5 is a block diagram of a system environment of a headset, according to one embodiment.

FIG. 5 is a block diagram of one embodiment of a headset system 500 in which a console 510 operates. The headset system 500 may operate in a VR system environment, an AR system environment, a MR system environment, or some combination thereof. The headset system 500 shown by FIG. 5 comprises a headset 505 and an input/output (I/O) interface 515 that is coupled to the console 510. While FIG. 5 shows an example headset 505 including one headset 505 and on I/O interface 515, in other embodiments any number of these components may be included in the headset 505. For example, there may be multiple headsets 505 each having an associated I/O interface 515, with each headset 505 and I/O interface 515 communicating with the console 510. In alternative configurations, different and/or additional components may be included in the headset 505. Additionally, functionality described in conjunction with one or more of the components shown in FIG. 5 may be distributed among the components in a different manner than described in conjunction with FIG. 5 in some embodiments. For example, some or all of the functionality of the console 510 is provided by the headset 505.

The headset 505 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the headset 505, the console 510, or both, and presents audio data based on the audio information. The headset 505 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the headset 505 is the headset 100 described above in conjunction with FIG. 1.

The headset 505 includes a depth camera assembly 520, an electronic display 525, an optical assembly 530, one or more position sensors 535, an IMU 540, an eye tracking system 545, and a varifocal module 550. Some embodiments of the headset 505 have different components than those described in conjunction with FIG. 5. Additionally, the functionality provided by various components described in conjunction with FIG. 5 may be differently distributed among the components of the headset 505 in other embodiments.

The depth camera assembly 520 includes multiple imaging sensors that capture data describing a local area surrounding some or all of the headset 505 and depth information associated with the local area. The depth camera assembly 520 computes depth information for one or more local regions within the local area using the data captured by the imaging sensors. When determining depth information for different local regions, one or more stereoimaging processes used by the depth camera assembly 520 propagate depth information determined for a local region to neighboring or adjacent local regions to determine depth information for the neighboring or adjacent local regions. To more efficiently use computing resources and power when determining depth information, the depth camera assembly 520 accounts for characteristics—such as contrast measurements or saturation measurements—of local regions to selectively propagate depth information determined for a local region to other local regions having specific characteristics, while attenuating propagation of depth information determined for the local region to other local regions that do not have the specific characteristics, as further described above in conjunction with FIGS. 3 and 4. In some embodiments, the DCA also comprises a structured light generator to further illuminate the surface of the area captured by the imaging sensors.

In some embodiments, the DCA 520 implements stereoimaging techniques to determine a depth measurement for a local region to compare the images of a common area as captured by different imaging sensors at various positions. The stereoimaging techniques may propagate depth information from the adjacent local regions when determining depth information for the adjacent local regions. As further described above, the DCA 520 selectively propagates depth information from the local region to adjacent local regions satisfying one or more criteria. For example, the DCA 520 limits propagation of depth information from the local region to adjacent local regions having a contrast measurement satisfying one or more criteria, to adjacent local regions having a saturation measurement satisfying one or more criteria, or to adjacent local regions having a distance from the local region satisfying one or more criteria. In the preceding example, the DCA 520 attenuates depth information for the local region that is propagated to adjacent local regions that do not satisfy one or more criteria, as further described above in conjunction with FIGS. 3 and 4.

The electronic display 525 displays 2D or 3D images to the user in accordance with data received from the console 510. In various embodiments, the electronic display 525 comprises a single electronic display or multiple electronic displays (e.g., a display for each eye of a user). Examples of the electronic display 525 include: a liquid crystal display (LCD), an organic light emitting diode (OLED) display, an inorganic light emitting diode (ILED) display, an active-matrix organic light emitting diode (AMOLED) display, a transparent organic light emitting diode (TOLED) display, some other display, or some combination thereof.

The optical assembly 530 magnifies image light received from the electronic display 525, corrects optical errors associated with the image light, and presents the corrected image light to a user of the headset 505. The optical assembly 530 includes a plurality of optical elements. Example optical elements included in the optical assembly 530 include: an aperture, a Fresnel lens, a convex lens, a concave lens, a filter, a reflecting surface, or any other suitable optical element that affects image light. Moreover, the optical assembly 530 may include combinations of different optical elements. In some embodiments, one or more of the optical elements in the optical assembly 530 may have one or more coatings, such as partially reflective or anti-reflective coatings.

Magnification and focusing of the image light by the optical assembly 530 allows the electronic display 525 to be physically smaller, weigh less and consume less power than larger displays. Additionally, magnification may increase the field of view of the content presented by the electronic display 525. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 530 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 525 for display is pre-distorted, and the optical assembly 530 corrects the distortion when it receives image light from the electronic display 525 generated based on the content.

The IMU 540 is an electronic device that generates data indicating a position of the headset 505 based on measurement signals received from one or more of the position sensors 535 and from depth information received from the depth camera assembly 520. A position sensor 535 generates one or more measurement signals in response to motion of the headset 505. Examples of position sensors 535 include: one or more accelerometers, one or more gyroscopes, one or more magnetometers, another suitable type of sensor that detects motion, a type of sensor used for error correction of the IMU 540, or some combination thereof. The position sensors 535 may be located external to the IMU 540, internal to the IMU 540, or some combination thereof.

Based on the one or more measurement signals from one or more position sensors 535, the IMU 540 generates data indicating an estimated current position of the headset 505 relative to an initial position of the headset 505. For example, the position sensors 535 include multiple accelerometers to measure translational motion (forward/back, up/down, left/right) and multiple gyroscopes to measure rotational motion (e.g., pitch, yaw, roll). In some embodiments, the IMU 540 rapidly samples the measurement signals and calculates the estimated current position of the headset 505 from the sampled data. For example, the IMU 540 integrates the measurement signals received from the accelerometers over time to estimate a velocity vector and integrates the velocity vector over time to determine an estimated current position of a reference point on the headset 505. Alternatively, the IMU 540 provides the sampled measurement signals to the console 510, which interprets the data to reduce error. The reference point is a point that may be used to describe the position of the headset 505. The reference point may generally be defined as a point in space or a position related to the orientation and position of the headset 505.

The IMU 540 receives one or more parameters from the console 510. The one or more parameters are used to maintain tracking of the headset 505. Based on a received parameter, the IMU 540 may adjust one or more IMU parameters (e.g., sample rate). In some embodiments, certain parameters cause the IMU 540 to update an initial position of the reference point so it corresponds to a next position of the reference point. Updating the initial position of the reference point as the next calibrated position of the reference point helps reduce accumulated error associated with the current position estimated the IMU 540. The accumulated error, also referred to as drift error, causes the estimated position of the reference point to "drift" away from the actual position of the reference point over time. In some embodiments of the headset 505, the IMU 540 may be a dedicated hardware component. In other embodiments, the IMU 540 may be a software component implemented in one or more processors.

In some embodiments, the eye tracking system 545 is integrated into the headset 505. The eye tracking system 545 determines eye tracking information associated with an eye of a user wearing the headset 505. The eye tracking information determined by the eye tracking system 545 may comprise information about an orientation of the user's eye, i.e., information about an angle of an eye-gaze. In some embodiments, the eye tracking system 545 is integrated into the optical assembly 530. An embodiment of the eye tracking system 545 may comprise an illumination source such as a dot array illuminator as described herein and an imaging device (camera).

n some embodiments, the varifocal module 550 is further integrated into the headset 505. The varifocal module 550 may be coupled to the eye tracking system 545 to obtain eye tracking information determined by the eye tracking system 545. The varifocal module 550 may be configured to adjust focus of one or more images displayed on the electronic display 525, based on the determined eye tracking information obtained from the eye tracking system 545. In this way, the varifocal module 550 can mitigate vergence-accommodation conflict in relation to image light. The varifocal module 550 can be interfaced (e.g., either mechanically or electrically) with at least one of the electronic display 525 and at least one optical element of the optical assembly 530. Then, the varifocal module 550 may be configured to adjust focus of the one or more images displayed on the electronic display 525 by adjusting position of at least one of the electronic display 525 and the at least one optical element of the optical assembly 530, based on the determined eye tracking information obtained from the eye tracking system 545. By adjusting the position, the varifocal module 550 varies focus of image light output from the electronic display 525 towards the user's eye. The varifocal module 550 may be also configured to adjust resolution of the images displayed on the electronic display 525 by performing foveated rendering of the displayed images, based at least in part on the determined eye tracking information obtained from the eye tracking system 545. In this case, the varifocal module 550 provides appropriate image signals to the electronic display 525. The varifocal module 550 provides image signals with a maximum pixel density for the electronic display 525 only in a foveal region of the user's eye-gaze, while providing image signals with lower pixel densities in other regions of the electronic display 525. In one embodiment, the varifocal module 550 may utilize the depth information obtained by the depth camera assembly 520 to, e.g., generate content for presentation on the electronic display 525.

The I/O interface 515 is a device that allows a user to send action requests and receive responses from the console 510. An action request is a request to perform a particular action. For example, an action request may be an instruction to start or end capture of image or video data or an instruction to perform a particular action within an application. The I/O interface 515 may include one or more input devices. Example input devices include: a keyboard, a mouse, a game controller, or any other suitable device for receiving action requests and communicating the action requests to the console 510. An action request received by the I/O interface 515 is communicated to the console 510, which performs an action corresponding to the action request. In some embodiments, the I/O interface 515 includes an IMU 540 that captures calibration data indicating an estimated position of the I/O interface 515 relative to an initial position of the I/O interface 515. In some embodiments, the I/O interface 515 may provide haptic feedback to the user in accordance with instructions received from the console 510. For example, haptic feedback is provided when an action request is received, or the console 510 communicates instructions to the I/O interface 515 causing the I/O interface 515 to generate haptic feedback when the console 510 performs an action.

The console 510 provides content to the headset 505 for processing in accordance with information received from one or more of: the depth camera assembly 520, the headset 505, and the I/O interface 515. In the example shown in FIG. 5, the console 510 includes an application store 555, a tracking module 560, and an engine 565. Some embodiments of the console 510 have different modules or components than those described in conjunction with FIG. 5. Similarly, the functions further described below may be distributed among components of the console 510 in a different manner than described in conjunction with FIG. 5.

The application store 555 stores one or more applications for execution by the console 510. An application is a group of instructions, that when executed by a processor, generates content for presentation to the user. Content generated by an application may be in response to inputs received from the user via movement of the headset 505 or the I/O interface 515. Examples of applications include: gaming applications, conferencing applications, video playback applications, or other suitable applications.

The tracking module 560 calibrates the headset system 500 using one or more calibration parameters and may adjust one or more calibration parameters to reduce error in determination of the position of the headset 505 or of the I/O interface 515. For example, the tracking module 560 communicates a calibration parameter to the depth camera assembly 520 to adjust the focus of the depth camera assembly 520 to more accurately determine positions of structured light elements captured by the depth camera assembly 520. Calibration performed by the tracking module 560 also accounts for information received from the IMU 540 in the headset 505 and/or an IMU 540 included in the I/O interface 515. Additionally, if tracking of the headset 505 is lost (e.g., the depth camera assembly 520 loses line of sight of at least a threshold number of structured light elements), the tracking module 560 may re-calibrate some or all of the headset system 500.

The tracking module 560 tracks movements of the headset 505 or of the I/O interface 515 using information from the depth camera assembly 520, the one or more position sensors 535, the IMU 540 or some combination thereof. For example, the tracking module 550 determines a position of a reference point of the headset 505 in a mapping of a local area based on information from the headset 505. The tracking module 560 may also determine positions of the reference point of the headset 505 or a reference point of the I/O interface 515 using data indicating a position of the headset 505 from the IMU 540 or using data indicating a position of the I/O interface 515 from an IMU 540 included in the I/O interface 515, respectively. Additionally, in some embodiments, the tracking module 560 may use portions of data indicating a position or the headset 505 from the IMU 540 as well as representations of the local area from the depth camera assembly 520 to predict a future location of the headset 505. The tracking module 560 provides the estimated or predicted future position of the headset 505 or the I/O interface 515 to the engine 565.

The engine 565 generates a 3D mapping of the area surrounding some or all of the headset 505 (i.e., the "local area") based on information received from the headset 505. In some embodiments, the engine 565 determines depth information for the 3D mapping of the local area based on information received from the depth camera assembly 520 that is relevant for techniques used in computing depth. The engine 565 may calculate depth information using one or more techniques in computing depth from one or more polarized structured light patterns. In various embodiments, the engine 565 uses the depth information to, e.g., update a model of the local area, and generate content based in part on the updated model.

The engine 565 also executes applications within the headset system 500 and receives position information, acceleration information, velocity information, predicted future positions, or some combination thereof, of the headset 505 from the tracking module 560. Based on the received information, the engine 565 determines content to provide to the headset 505 for presentation to the user. For example, if the received information indicates that the user has looked to the left, the engine 565 generates content for the headset 505 that mirrors the user's movement in a virtual environment or in an environment augmenting the local area with additional content. Additionally, the engine 565 performs an action within an application executing on the console 510 in response to an action request received from the I/O interface 515 and provides feedback to the user that the action was performed. The provided feedback may be visual or audible feedback via the headset 505 or haptic feedback via the I/O interface 515.

In some embodiments, based on the eye tracking information (e.g., orientation of the user's eye) received from the eye tracking system 545, the engine 565 determines resolution of the content provided to the headset 505 for presentation to the user on the electronic display 525. The engine 565 provides the content to the headset 505 having a maximum pixel resolution on the electronic display 525 in a foveal region of the user's gaze, whereas the engine 565 provides a lower pixel resolution in other regions of the electronic display 525, thus achieving less power consumption at the headset 505 and saving computing cycles of the console 510 without compromising a visual experience of the user. In some embodiments, the engine 565 can further use the eye tracking information to adjust where objects are displayed on the electronic display 525 to prevent vergence-accommodation conflict.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   capturing, by each of a plurality of imaging sensors, an image of a local area including a local region, the local region represented by a first set of pixels in each captured image;
   identifying, for each image, the first set of pixels corresponding to the local region;
   determining, from the image captured by each of the plurality of imaging sensors, a depth measurement of the local region, the depth measurement determined by a comparison between the first set of pixels from the image captured by each of the plurality of imaging sensors;
   determining, for each of one or more second sets of pixels neighboring the first set of pixels, a contrast measurement associated with each second set of pixels; and
   responsive to determining a contrast measurement for a second set of pixels is above a threshold contrast measurement, propagating the depth measurement of the local region corresponding to the first set of pixels to a local region corresponding to the second set of pixels having the contrast measurement above the threshold contrast.

2. The method of claim 1, wherein the depth measurement is determined by performing semi-global matching (SGM) techniques to the first set of pixels from the image captured by each of the plurality of imaging sensors, the SGM techniques propagating the depth measurement of the local region corresponding to the first set of pixels to one or more sets of pixels adjacent to the first set of pixels.

3. The method of claim 1, further comprising:
   responsive to determining the contrast measurement for the second set of pixels is below the threshold contrast measurement, attenuating propagation of the depth measurement of the local region corresponding to the first set of pixels to the local region corresponding to the second set of pixels.

4. The method of claim 3, wherein attenuating propagation of the depth measurement of the local region to the second set of pixels comprises:
   withholding propagation of the depth measurement of the local region corresponding to the first set of pixels to the local region corresponding to the second set of pixels.

5. The method of claim 1, further comprising:
   assigning a first weight to each second set of pixels having a contrast measurement above the threshold contrast measurement;
   determining a depth measurement for each second set of pixels having the contrast measurement above the threshold contrast measurement by applying the first weight to the depth measurement of the local region corresponding to the first set of pixels;
   assigning a second weight to each second set of pixels having a contrast measurement below the threshold contrast measurement; and
   determining a depth measurement for each second set of pixels having a contrast measurement below the threshold contrast measurement by applying the second weight to the depth measurement of the local region corresponding to the first set of pixels.

6. The method of claim 1, further comprising:
measuring a distance in the images captured by the imaging sensors between each pixel of the first set of pixels and each pixel of the second set of pixels; and
propagating the depth measurement of the local region corresponding to the first set of pixels to one or more pixels of the second set with a measured distance within a threshold distance of at least one pixel of the first set.

7. The method of claim 1, further comprising:
determining, for each of one or more second sets of pixels neighboring the first set of pixels, a saturation measurement associated with each second set of pixels; and
responsive to determining the saturation measurement of the second set of pixels is above a threshold saturation measurement, attenuating propagation of the depth measurement of the local region corresponding to the first set of pixels to the local region corresponding to the second set of pixels.

8. The method of claim 7, wherein attenuating propagation of the depth measurement of the local region to the second set of pixels comprises:
withholding propagation of the depth measurement of the local region corresponding to the first set of pixels to the local region corresponding to the second set of pixels.

9. A depth camera assembly (DCA) comprising:
a plurality of imaging sensors configured to capture an image of a local area including a local region, the local region represented by a first set of pixels in each captured image; and
a controller configured to:
identify, for each image, the first set of pixels corresponding to the local region;
determine, from the image captured by each of the plurality of imaging sensors, a depth measurement of the local region, the depth measurement determined by a comparison between the first set of pixels from the image captured by each of the plurality of imaging sensors;
determine, for each of one or more second sets of pixels neighboring the first set of pixels, a contrast measurement associated with each second set of pixels; and
responsive to determining a contrast measurement for a second set of pixels is above a threshold contrast measurement, propagate the depth measurement of the local region corresponding to the first set of pixels to a local region corresponding to the second set of pixels having the contrast measurement above the threshold contrast.

10. The DCA of claim 9, wherein the controller is further configured to determine the depth measurement by performing semi-global matching (SGM) techniques to the first set of pixels from the image captured by each of the plurality of imaging sensors, the SGM techniques propagating the depth measurement of the local region corresponding to the first set of pixels to one or more sets of pixels adjacent to the first set of pixels.

11. The DCA of claim 9, wherein the controller is further configured to:
responsive to determining the contrast measurement for the second set of pixels is below the threshold contrast measurement, attenuate propagation of the depth measurement of the local region corresponding to the first set of pixels to the local region corresponding to the second set of pixels.

12. The DCA of claim 9, wherein the controller is further configured to:
assign a first weight to each second set of pixels having a contrast measurement above the threshold contrast measurement;
determine a depth measurement for each second set of pixels having the contrast measurement above the threshold contrast measurement by applying the first weight to the depth measurement of the local region corresponding to the first set of pixels;
assign a second weight to each second set of pixels having a contrast measurement below the threshold contrast measurement; and
determine a depth measurement for each second set of pixels having a contrast measurement below the threshold contrast measurement by applying the second weight to the depth measurement of the local region corresponding to the first set of pixels.

13. The DCA of claim 9, wherein the controller is further configured to:
measure a distance in the images captured by the imaging sensors between each pixel of the first set of pixels and each pixel of the second set of pixels; and
propagate the depth measurement of the local region corresponding to the first set of pixels to one or more pixels of the second set with a measured distance within a threshold distance of at least one pixel of the first set.

14. The DCA of claim 9, wherein the controller is further configured to:
determine, for each of one or more second sets of pixels neighboring the first set of pixels, a saturation measurement associated with each second set of pixels; and
responsive to determining the saturation measurement of the second set of pixels is above a threshold saturation measurement, attenuate propagation of the depth measurement of the local region corresponding to the first set of pixels to the local region corresponding to the second set of pixels.

15. A non-transitory computer readable medium comprising computer program instructions that when executed by a computer processor cause the processor to:
capture, by each of a plurality of imaging sensors, an image of a local area including a local region, the local region represented by a first set of pixels in each captured image;
identify, for each image, the first set of pixels corresponding to the local region;
determine, from the image captured by each of the plurality of imaging sensors, a depth measurement of the local region, the depth measurement determined by a comparison between the first set of pixels from the image captured by each of the plurality of imaging sensors;
determine, for each of one or more second sets of pixels neighboring the first set of pixels, a contrast measurement associated with each second set of pixels; and
responsive to determining a contrast measurement for a second set of pixels is above a threshold contrast measurement, propagate the depth measurement of the local region corresponding to the first set of pixels to a local region corresponding to the second set of pixels having the contrast measurement above the threshold contrast.

16. The non-transitory computer readable storage medium of claim 15, wherein the computer program instructions further cause the processor to determine a depth measurement by performing semi-global matching (SGM) techniques to the first set of pixels from the image captured by each of the plurality of imaging sensors, the SGM techniques propagating the depth measurement of the local region corresponding to the first set of pixels to one or more sets of pixels adjacent to the first set of pixels.

17. The non-transitory computer readable storage medium of claim 15, wherein the computer program instructions further cause the processor to:
responsive to determining the contrast measurement for the second set of pixels is below the threshold contrast measurement, attenuate propagation of the depth measurement of the local region corresponding to the first set of pixels to the local region corresponding to the second set of pixels.

18. The non-transitory computer readable storage medium of claim 15, wherein the computer program instructions further cause the processor to:
assign a first weight to each second set of pixels having a contrast measurement above the threshold contrast measurement;
determine a depth measurement for each second set of pixels having the contrast measurement above the threshold contrast measurement by applying the first weight to the depth measurement of the local region corresponding to the first set of pixels;
assign a second weight to each second set of pixels having a contrast measurement below the threshold contrast measurement; and
determine a depth measurement for each second set of pixels having a contrast measurement below the threshold contrast measurement by applying the second weight to the depth measurement of the local region corresponding to the first set of pixels.

19. The non-transitory computer readable storage medium of claim 15, wherein the computer program instructions further cause the processor to:
measure a distance in the images captured by the imaging sensors between each pixel of the first set of pixels and each pixel of the second set of pixels; and
propagate the depth measurement of the local region corresponding to the first set of pixels to one or more pixels of the second set with a measured distance within a threshold distance of at least one pixel of the first set.

20. The non-transitory computer readable storage medium of claim 15, wherein the computer program instructions further cause the processor to:
determine, for each of one or more second sets of pixels neighboring the first set of pixels, a saturation measurement associated with each second set of pixels; and
responsive to determining the saturation measurement of the second set of pixels is above a threshold saturation measurement, attenuate propagation of the depth measurement of the local region corresponding to the first set of pixels to the local region corresponding to the second set of pixels.

* * * * *